United States Patent
Sasajima

(10) Patent No.: US 10,459,448 B2
(45) Date of Patent: Oct. 29, 2019

(54) DRIVING ASSISTANCE APPARATUS

(71) Applicant: HONDA MOTOR CO., LTD., Minato-ku, Tokyo (JP)

(72) Inventor: Koji Sasajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/153,957

(22) Filed: Oct. 8, 2018

(65) Prior Publication Data

US 2019/0107841 A1    Apr. 11, 2019

(30) Foreign Application Priority Data

Oct. 10, 2017 (JP) .................... 2017-196926

(51) Int. Cl.
| | |
|---|---|
| *G01C 21/36* | (2006.01) |
| *G05D 1/02* | (2006.01) |
| *G05D 1/00* | (2006.01) |
| *G06N 20/00* | (2019.01) |
| *B60W 30/00* | (2006.01) |

(52) U.S. Cl.
CPC .......... *G05D 1/0221* (2013.01); *B60W 30/00* (2013.01); *G01C 21/3641* (2013.01); *G05D 1/0061* (2013.01); *G05D 1/0088* (2013.01); *G06N 20/00* (2019.01); *G05D 2201/0213* (2013.01)

(58) Field of Classification Search
USPC ........................................................ 701/538
See application file for complete search history.

(56) References Cited

U.S. PATENT DOCUMENTS

| | | | |
|---|---|---|---|
| 10,197,408 B1* | 2/2019 | Ledet | G01C 21/3635 |
| 2011/0288762 A1* | 11/2011 | Kuznetsov | G01C 21/32 |
| | | | 701/532 |
| 2014/0187258 A1* | 7/2014 | Khorashadi | G01C 21/206 |
| | | | 455/456.1 |

(Continued)

FOREIGN PATENT DOCUMENTS

| | | |
|---|---|---|
| JP | 2006-282073 A | 10/2006 |
| JP | 2007-286810 A | 11/2007 |

(Continued)

OTHER PUBLICATIONS

Office Action dated Jul. 2, 2019 issued over the corresponding Japanese Patent Application 2017-196926 with the English translation thereof.

*Primary Examiner* — Masud Ahmed
(74) *Attorney, Agent, or Firm* — Carrier Blackman & Associates, P.C.; Joseph P. Carrier; Jeffrey T. Gedeon

(57) ABSTRACT

A driving assistance apparatus includes: a registration processing unit configured to register, as an assistance location, an assistance location candidate detected as a location at which driving assistance for an own vehicle is necessary if the assistance location candidate satisfies a registration condition; and a region segmentation unit configured to set a first activity region in which an activity frequency of the own vehicle is estimated to be relatively high and a second activity region in which an activity frequency of the own vehicle is estimated to be relatively low. In a case where the assistance location candidate falls in the second activity region, the registration processing unit relaxes the registration condition compared to a case of falling in the first activity region (the assistance location candidate).

5 Claims, 7 Drawing Sheets

(56) References Cited

U.S. PATENT DOCUMENTS

2016/0091335 A1* 3/2016 Bhatt ................. G01C 21/3617
                                                                                  701/538
2018/0246907 A1* 8/2018 Thiel ...................... G01C 21/32

FOREIGN PATENT DOCUMENTS

| JP | 2015-099442 A | 5/2015 |
| JP | 2015-194945 A | 11/2015 |

* cited by examiner

DRIVING ASSISTANCE APPARATUS

CROSS-REFERENCE TO RELATED APPLICATION

This application is based upon and claims the benefit of priority from Japanese Patent Application No. 2017-196926 filed on Oct. 10, 2017, the contents of which are incorporated herein by reference.

BACKGROUND OF THE INVENTION

Field of the Invention

The present invention relates to a driving assistance apparatus for providing driving assistance to an own vehicle at a registered assistance location.

Description of the Related Art

Conventionally, techniques for providing driving assistance for an own vehicle have been known. For instance, various apparatuses have been proposed for enabling appropriate driving assistance even on a road a driver has not traveled previously or a road the driver travels infrequently.

Japanese Laid-Open Patent Publication No. 2006-282073 (claim 1, [0040] etc.) proposes a vehicle control device which learns road information about a road on which the own vehicle traveled in association with vehicle control information on vehicle control performed at the time of traveling on that road. According to the description therein, in order to reliably ascertain the driver's preference, a learning value is updated and reflected into vehicle control (that is, driving assistance) when the number of learnings made at the same map location exceeds a predetermined threshold, for example.

SUMMARY OF THE INVENTION

For the device proposed in Japanese Laid-Open Patent Publication No. 2006-282073 (claim 1, [0040] etc.), there is no specific description on how the threshold for the number of learnings is established. For example, consider a learning process where an assistance location candidate is registered as an assistance location when the number of times a certain location has been detected as such an assistance location candidate (that is, the number of learnings) exceeds a certain threshold.

In an activity region where the frequency of the user's activities is relatively high (a so-called everyday life area), the number of times the user drives around such a location is expected to be high. As a consequence, the time required before the location is registered as an assistance location would be short, which is desirable for the user who can receive driving assistance.

In contrast, in an activity region where the frequency of the user's activities is relatively low (a so-called non-everyday life area), the number of times the user drives around such a location is expected to be low. As a consequence, the location remains not registered as an assistance location and no driving assistance is executed until the number of learnings at that location reaches the threshold.

The present invention has been made to address the drawback outlined above and an object thereof is to provide a driving assistance apparatus that can execute appropriate driving assistance in consideration of the activity frequency of the own vehicle.

A driving assistance apparatus according to the present invention includes: a location detection unit configured to detect, as an assistance location candidate, a location at which driving assistance for an own vehicle is necessary in a driving area of the own vehicle; a registration processing unit configured to register the assistance location candidate as an assistance location if the assistance location candidate detected by the location detection unit satisfies a registration condition; a driving assistance unit configured to provide driving assistance to the own vehicle at the assistance location registered by the registration processing unit; and a region segmentation unit configured to segment the driving area to set a first activity region in which an activity frequency of the own vehicle is estimated to be relatively high and a second activity region in which the activity frequency of the own vehicle is estimated to be relatively low. In a case where the assistance location candidate falls in the second activity region, the registration processing unit relaxes the registration condition compared to a case of falling in the first activity region.

As described, in a case where an assistance location candidate falls in the second activity region in which the activity frequency of the own vehicle is estimated to be relatively low, the registration condition is relaxed compared to a case of falling in the first activity region in which the activity frequency of the own vehicle is estimated to be relatively high. Consequently, the possibility of driving assistance being available becomes relatively high even at a location in the second activity region, enabling execution of appropriate driving assistance in consideration of the activity frequency of the own vehicle.

The registration condition may be that a number of times the assistance location candidate has been detected or a number of times the assistance location candidate has been passed through exceeds a threshold with regard to a same vehicle or user, and the registration processing unit may relax the registration condition by making the threshold smaller in a case where the assistance location candidate falls in the second activity region than in a case of falling in the first activity region.

When adding a new assistance location while a number of registrations of the assistance locations falling in the first activity region has reached an upper limit, the registration processing unit may perform a registration process for deleting the assistance location at which an execution frequency of driving assistance is lowest. This can effectively leave assistance locations with higher execution frequency of driving assistance while keeping the number of registrations in the first activity region small.

When adding a new assistance location while a number of registrations of the assistance locations falling in the second activity region has reached an upper limit, the registration processing unit may perform a registration process for deleting the assistance location farthest from a position of the first activity region. This can effectively leave assistance locations near from the first activity region while keeping the number of registrations in the second activity region small.

The driving assistance apparatus may further include a time acquisition unit configured to acquire time information during traveling of the own vehicle, and the region segmentation unit may vary setting of the first activity region or the second activity region in accordance with the time information acquired by the time acquisition unit. This allows the driving area to be segmented while incorporating the trend of the activity region of the own vehicle possibly varying depending on the time of travel.

The driving assistance apparatus according to the present invention can provide appropriate driving assistance in consideration of the activity frequency of the own vehicle.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A driving assistance apparatus according to the present invention is described below by showing preferred embodiments with reference to the attached drawings.

[Configuration of Driving Assistance Apparatus 10]

Figure 1:
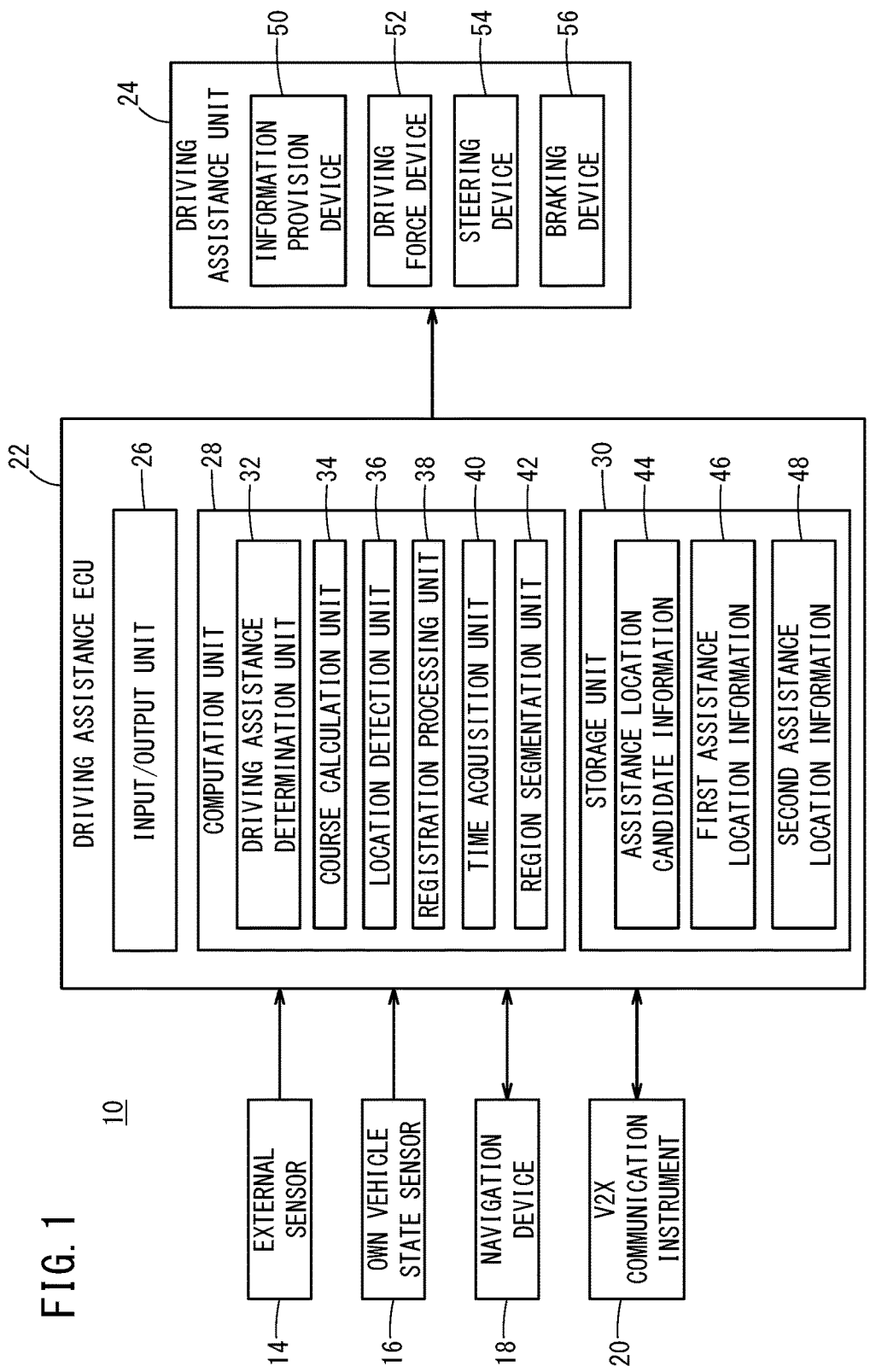
FIG. 1 shows an overall configuration of a driving assistance apparatus in an embodiment of the present invention.

FIG. 1 shows an overall configuration of a driving assistance apparatus 10 in an embodiment of the present invention. The driving assistance apparatus 10 is an apparatus installed on a vehicle (an own vehicle 12 in FIG. 3) and capable of executing driving assistance for the vehicle. The driving assistance includes intersection collision prevention assistance or left-turn collision prevention assistance, for example.

The driving assistance apparatus 10 includes an external sensor 14, an own vehicle state sensor 16, a navigation device 18, a V2X communication instrument 20, a driving assistance ECU 22, and a driving assistance unit 24.

<Configurations of Input-Related Devices>

The external sensor 14 acquires information indicative of the state of the world outside the vehicle (hereinafter referred to as external information) and outputs the external information to the driving assistance ECU 22. The external sensor 14 is composed of a camera, a radar, and a LIDAR (light detection and ranging/laser imaging detection and ranging), for example.

The own vehicle state sensor 16 acquires information indicative of the state of the vehicle (hereinafter referred to as vehicle state information) and outputs the vehicle state information to the driving assistance ECU 22. The own vehicle state sensor 16 may include various sensors for detecting the behavior of the vehicle, such as a velocity sensor, an acceleration sensor, a steer angle sensor, a yaw rate sensor, a position sensor, and an orientation sensor, or a sensor for detecting the state of an occupant's operation of the vehicle.

The navigation device 18 is composed of a satellite positioning device capable of detecting the current position of the vehicle and a user interface (for example, a touch panel display, a speaker, and a microphone). The navigation device 18 calculates a route to a designated destination based on the current position of the vehicle or on a position specified by the user and outputs the route to the driving assistance ECU 22.

The V2X communication instrument 20 receives outside information through communication with other vehicles around the vehicle (vehicle-to-vehicle communication, so-called V2V communication) or through communication with roadside devices around the vehicle (roadside-to-vehicle communication, so-called V2R communication), and outputs the outside information to the driving assistance ECU 22.

<Configuration of Driving Assistance ECU 22>

The driving assistance ECU 22 is a computing machine including one or multiple computers. In this embodiment, the driving assistance ECU 22 functions as an input/output unit 26, a computation unit 28, and a storage unit 30.

Signals from the external sensor 14, the own vehicle state sensor 16, the navigation device 18, and the V2X communication instrument 20 are input to the driving assistance ECU 22 side via the input/output unit 26. Signals from the driving assistance ECU 22 are output to the driving assistance unit 24 side via the input/output unit 26. The input/output unit 26 includes A/D converter circuitry (not shown) to convert an input analog signal to a digital signal.

The computation unit 28 executes arithmetic processing using signals input via the input/output unit 26 and generates control signals corresponding to the components of the driving assistance unit 24 based on the results of computation obtained. The computation unit 28 functions as a driving assistance determination unit 32, a course calculation unit 34, a location detection unit 36, a registration processing unit 38, a time acquisition unit 40, and a region segmentation unit 42.

The functions of the components of the computation unit 28 are implemented by reading and execution of programs stored in the storage unit 30. Alternatively, the programs may be supplied from the outside via a wireless communication device (not shown; such as a mobile telephone and a smartphone).

The storage unit 30 includes random access memory (RAM) for storing temporary data for use in arithmetic processing at the computation unit 28 as well as read only memory (ROM) for storing executable programs and tables or maps. In the example shown in FIG. 1, the storage unit 30 stores assistance location candidate information 44, first assistance location information 46, and second assistance location information 48.

<Configurations of Output-Related Devices>

The driving assistance unit 24 performs driving assistance operations for the own vehicle 12 (for example, output of information to the user or driving control on the vehicle) in accordance with a control command from the driving assistance ECU 22. Specifically, the driving assistance unit 24 includes an information provision device 50, a driving force device 52, a steering device 54, and a braking device 56.

The information provision device 50 is a human machine interface (HMI) device composed of a display or a speaker, for example, and outputs information for assisting the user's driving (hereinafter driving assistance information). The driving assistance information includes traffic information relating to intersections or traffic lights as well as various kinds of information for assisting smooth driving, leisurely driving, or eco-friendly driving or preventing a traffic accident, for example.

The driving force device 52 generates driving force (torque) for traveling of the vehicle in accordance with a driving control value from the driving assistance ECU 22 and transmits the driving force to the wheels indirectly via a transmission or directly. The steering device 54 changes the direction of the wheels (the steering wheel) in accordance with a driving control value from the driving assistance ECU 22. The braking device 56 brakes the wheels in accordance with a driving control value from the driving assistance ECU 22.

<Data Structure Example>

Figure 2A:
FIG. 2A illustrates a data structure of the assistance location candidate information from FIG. 1.

FIG. 2A illustrates a data structure of the assistance location candidate information 44 from FIG. 1. The assistance location candidate information 44 is information about assistance location candidates 68, 70 (FIG. 3), specifically including position coordinates, assistance specifics, and confidence. The "position coordinates" is information capable of uniquely determining a location in a driving area 60 (FIG. 3), for example, a combination of a longitude and a latitude. The "assistance specifics" includes alert, warning, provision of information, deceleration, stop, steering shift, acceleration, or a combination thereof, for example.

The "confidence" is a metric indicating the confidence of information on the assistance location candidates 68, 70, where the greater the value of confidence, higher necessity for driving assistance may be determined. An example of this metric may be the number of detections or the number of passages (sometimes collectively referred to as the "number of learnings") which are discussed later, although this is merely exemplary.

Figure 2B:
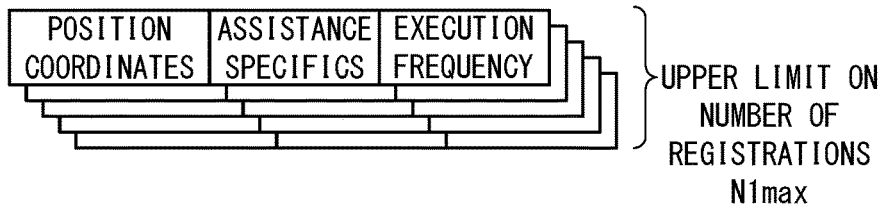
FIG. 2B illustrates a data structure of the first assistance location information from FIG. 1.

FIG. 2B illustrates a data structure of the first assistance location information 46 from FIG. 1. The first assistance location information 46 is information about an assistance location 66 that falls in a first activity region 94 discussed later (FIG. 7), specifically including position coordinates, assistance specifics, and execution frequency.

The "execution frequency" represents how frequently driving assistance has been actually provided at the assistance location 66, such as the total number of executions, the number of executions within a most recent predetermined period, or the date and time of the latest execution. It is also noted that due to limitation in memory capacity, an upper limit (N1max) is established on the number of assistance locations 66 that can be registered.

Figure 2C:
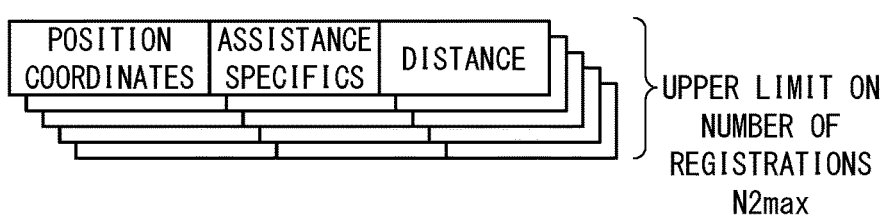
FIG. 2C illustrates a data structure of the second assistance location information from FIG. 1.

FIG. 2C illustrates a data structure of the second assistance location information 48 from FIG. 1. The second assistance location information 48 is information about an assistance location 66 that falls in a second activity region 96 discussed later (FIG. 7), specifically including position coordinates, assistance specifics, and distance.

The "distance" refers to the distance between a predetermined reference position 92 (FIG. 7) and the assistance location 66. Due to limitation in memory capacity, an upper limit (N2max) is established on the number of assistance locations 66 that can be registered. N2max may be the same value as the N1max above or a different value.

[Operation of Driving Assistance Apparatus 10]

The driving assistance apparatus 10 in this embodiment is configured as described above. The operation of the driving assistance apparatus 10 is described next.

<Input of Activity Area>

Figure 3:
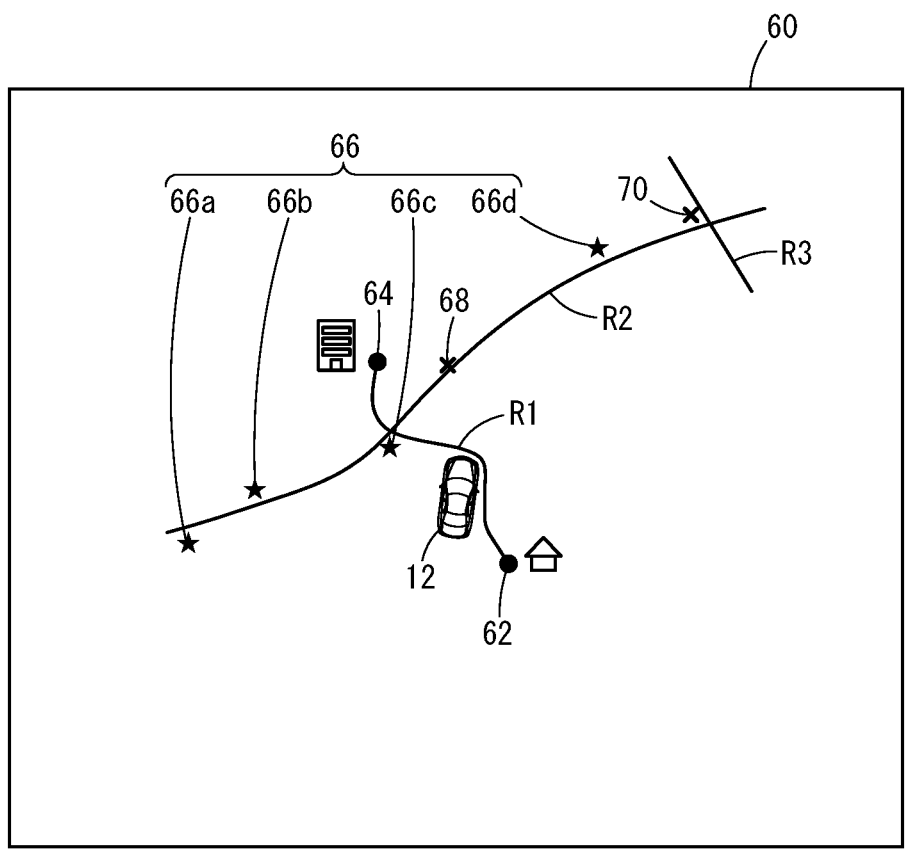
FIG. 3 illustrates the activity area of a user in his/her driving area.

FIG. 3 illustrates the activity area of the user in the driving area 60. In the driving area 60 of the own vehicle 12, at least three roads R1, R2, R3 are present. A first point 62 is the user's home, being located by the road R1. A second point 64 is the user's office, being located by the road R1.

If the user commutes to work by driving the own vehicle 12, the user utilizes the input functionality of the navigation device 18, for example, to register his/her activity area in the driving area 60 of the own vehicle 12 beforehand. This completes the preparation for customized (per-vehicle/per-user) registration of the assistance locations 66.

In the example shown in FIG. 3, four assistance locations 66 have been registered along the road R2. For distinction of the four assistance locations 66, they may be denoted below as assistance locations 66a, 66b, 66c, 66d in order from the left. The two assistance location candidates 68, 70 are locations where driving assistance for the own vehicle 12 is necessary but which have not been registered yet as assistance locations 66 because they do not meet a registration condition.

<Specific Example of Assistance Location 66>

Figure 4:
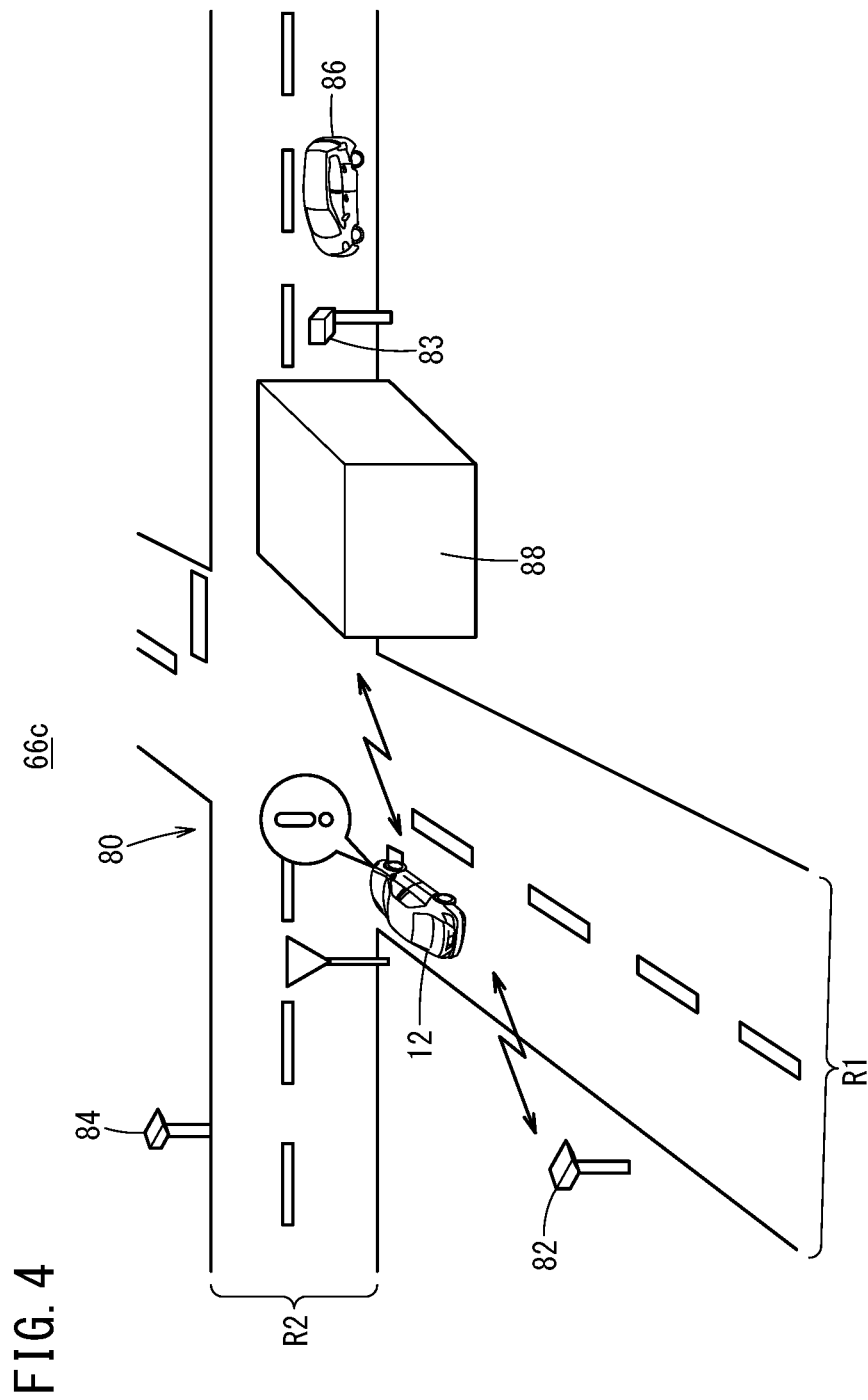
FIG. 4 schematically illustrates a driving scene around an assistance location.

FIG. 4 schematically illustrates a driving scene around the assistance location 66c. The assistance location 66c corresponds to an intersection 80 on the roads R1 and R2 shown in FIG. 3. Around the intersection 80, roadside devices 82, 83, 84 are installed. FIG. 4 depicts roads in a country where it is stipulated that automobiles drive on the left side.

The own vehicle 12 on the road R1 once stops before the intersection 80 and intends to go straight down the intersection 80. Meanwhile, another vehicle 86 on the road R2 intends to drive straight down through the intersection 80 from the right side of the own vehicle 12. However, a building 88 at a corner of the intersection 80 obstructs the right-side view of the own vehicle 12 (the driver).

Under these circumstances, after the own vehicle 12 stops before the intersection 80, the driving assistance apparatus 10 acquires information on the presence or absence of the other vehicle 86 via the roadside device 82 or the other vehicle 86 and provides alerting information to the driver if necessary. In this manner, intersection collision prevention assistance is executed for reducing the possibility of an accident resulting from an inappropriate start of the vehicle, which can be caused by the carelessness of the driver or poor view.

Such driving assistance might not be received, however, during driving in an area where road infrastructures (the roadside devices 82 to 84) are not in place and high-precision maps have not been created. For such a case, it is preferable to incorporate learning functionality for registering the assistance location candidate 68, 70 as the assistance location 66 if the number of times the assistance location candidate 68, 70 has been detected (that is, the number of learnings) exceeds a certain threshold.

<Implementing Driving Assistance>

Figure 5:
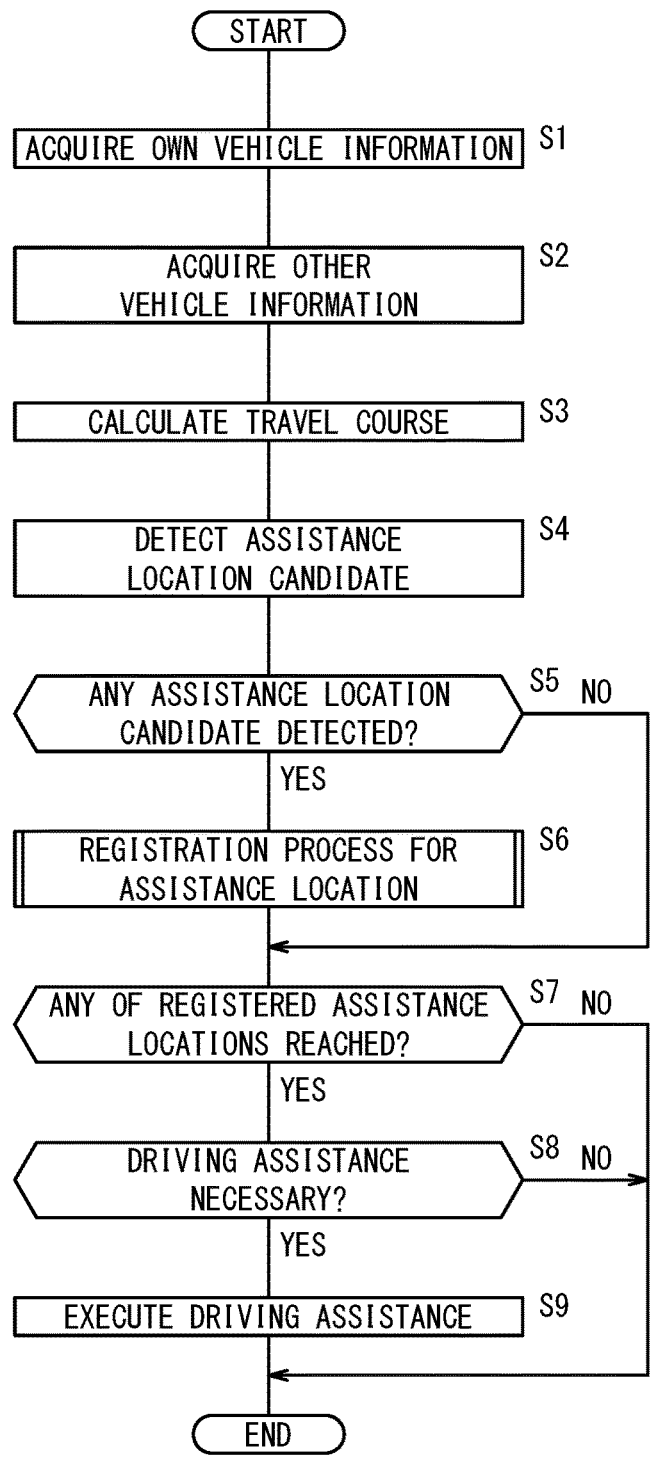
FIG. 5 is a flowchart illustrating the operation of the driving assistance apparatus shown in FIG. 1.

Referring to the flowchart of FIG. 5, driving assistance operations for the own vehicle 12 are described. The driving assistance apparatus 10 repeatedly executes the flowchart at intervals of a predetermined amount of time, for example.

At step S1 of FIG. 5, the course calculation unit 34 acquires own vehicle information indicative of the state of the own vehicle 12 based on an output signal from the own vehicle state sensor 16. This own vehicle information includes the position of the own vehicle, its velocity, acceleration, steer angle, and yaw rate as well as the state of the user's operation, for example.

At step S2, the course calculation unit 34 acquires other vehicle information indicative of the state of the other vehicle 86 based on an output signal from the external sensor 14 or a received signal from the V2X communication instrument 20. This other vehicle information includes the position of the other vehicle, its velocity, acceleration, and the operational state of the brake, for example.

At step S3, the course calculation unit 34 calculates a travel course for the own vehicle 12 from the relative positional relationship between the own vehicle 12 and the other vehicle 86. The course calculation unit 34 uses various prediction schemes to calculate a course which will not interfere with other objects including the other vehicle 86 and which can be smoothly traveled.

At step S4, the location detection unit 36 detects a candidate for the assistance location 66 (assistance location candidate 68, 70) based on the various kinds of information acquired at steps S1 and S2. Specifically, the location detection unit 36 determines whether a driving scene determined from the various kinds of information represents a situation with difficulty in driving or not, and detects any assistance location candidate 68, 70 as necessary.

At step S5, the registration processing unit 38 checks whether any assistance location candidate 68, 70 was detected at step S4 or not. If no assistance location candidate 68, 70 was detected (step S5: NO), the flow skips the execution of step S6 and proceeds to step S7. On the other hand, if an assistance location candidate 68, 70 was detected (step S5: YES), the flow proceeds to step S6.

At step S6, the registration processing unit 38 performs a registration process associated with the assistance location candidate 68, 70 detected at step S4. As will be described later, the registration processing unit 38 registers the assistance location candidate 68, 70 as the assistance location 66 if the registration condition holds, and does not register it as the assistance location 66 if the registration condition does not hold.

At step S7, the driving assistance determination unit 32 determines whether the own vehicle 12 has reached any of the already registered assistance locations 66 or not. If the own vehicle 12 has not reached any of the assistance locations 66 yet (step S7: NO), the flow skips execution of steps S8 and S9 and the flowchart of FIG. 5 ends. On the other hand, if the own vehicle 12 has reached any of the assistance locations 66 (step S7: YES), the flow proceeds to the next step S8.

At step S8, the driving assistance determination unit 32 determines whether driving assistance for the own vehicle 12 is necessary or not. If it is determined that driving assistance is not necessary (step S8: NO), the flow skips the execution of step S9 and the flowchart of FIG. 5 ends. On the other hand, if it is determined that driving assistance is necessary (step S8: YES), the flow proceeds to the next step S9.

At step S9, the driving assistance unit 24 provides driving assistance to the own vehicle 12 located at the assistance location 66. Specifically, the driving assistance unit 24 performs a driving assistance operation appropriate for the assistance location 66 in question (specifically, alert, warning, provision of information, deceleration, stop, steering shift, or acceleration) in accordance with a control command from the driving assistance ECU 22.

<Registration Process for Assistance Location 66>

Referring to the flowchart of FIG. 6, the specific operation of the registration process for the assistance location 66 (step S6 of FIG. 5) will be described in detail. The following description shows [1] a case where the location detection unit 36 detects the assistance location candidate 68 and [2] a case where it detects the assistance location candidate 70, with differentiation of the two cases where necessary.

Figure 6:
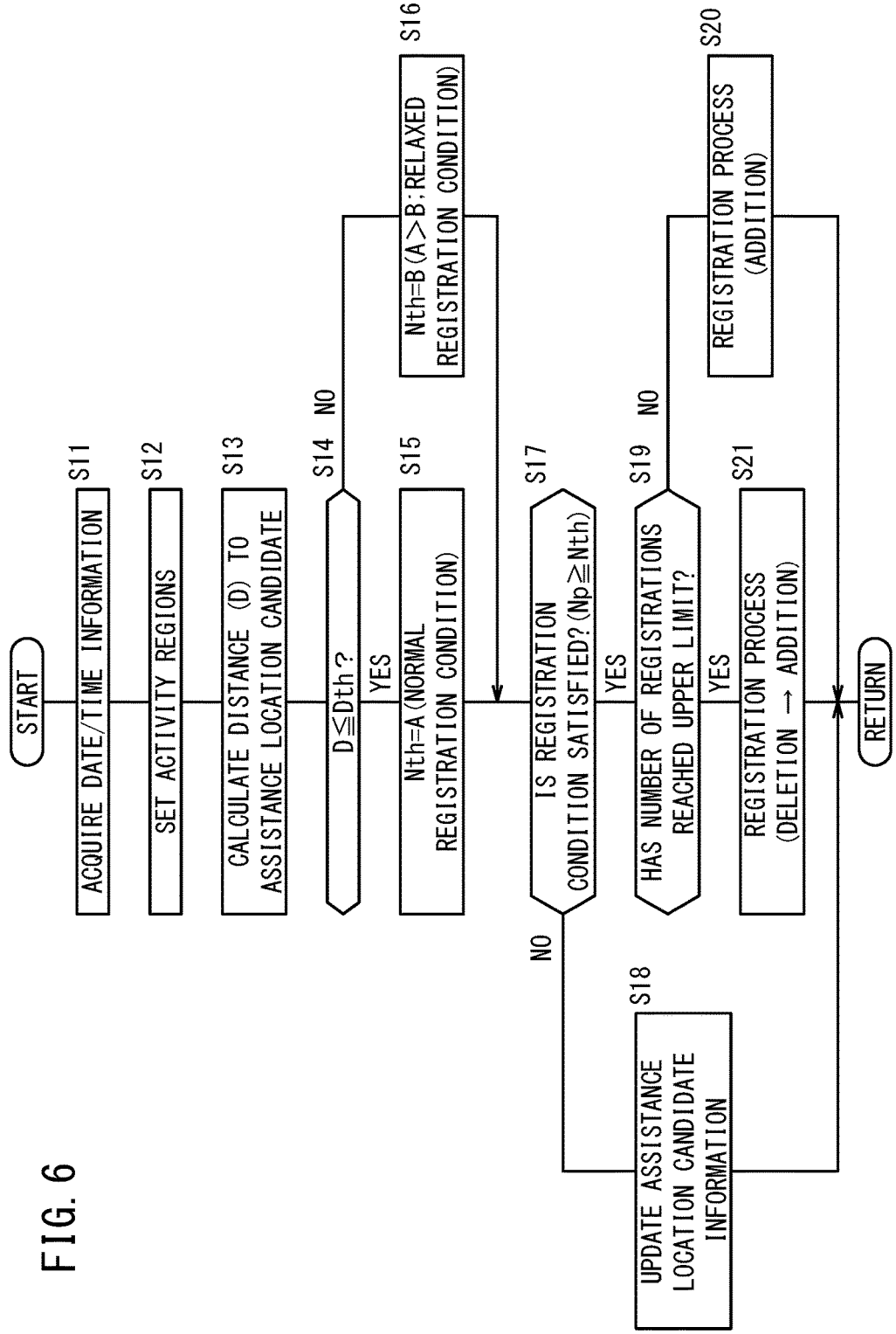
FIG. 6 is a detailed flowchart relating to a registration process at step S6 (FIG. 5)

At step S11 of FIG. 6, the time acquisition unit 40 acquires date/time information corresponding to a time during traveling of the own vehicle 12. This date/time information includes a time (year, month, day, hour, minute, and second) as well as a time of day, a day of the week, a beginning, middle, or end of a month, and a month and a season in a year, for example.

At step S12, the region segmentation unit 42 segments the driving area 60 in accordance with the frequency of travel of the own vehicle 12 to set multiple activity regions. In this example, the region segmentation unit 42 sets the first activity region 94 in which the activity frequency of the own vehicle 12 is estimated to be relatively high and the second activity region 96 in which the activity frequency of the own vehicle 12 is estimated to be relatively low. As an example, the activity frequency may be estimated to be higher at a position closer to the first point 62 or the second point 64 and to be lower at a position farther from the first point 62 or the second point 64.

Figure 7:
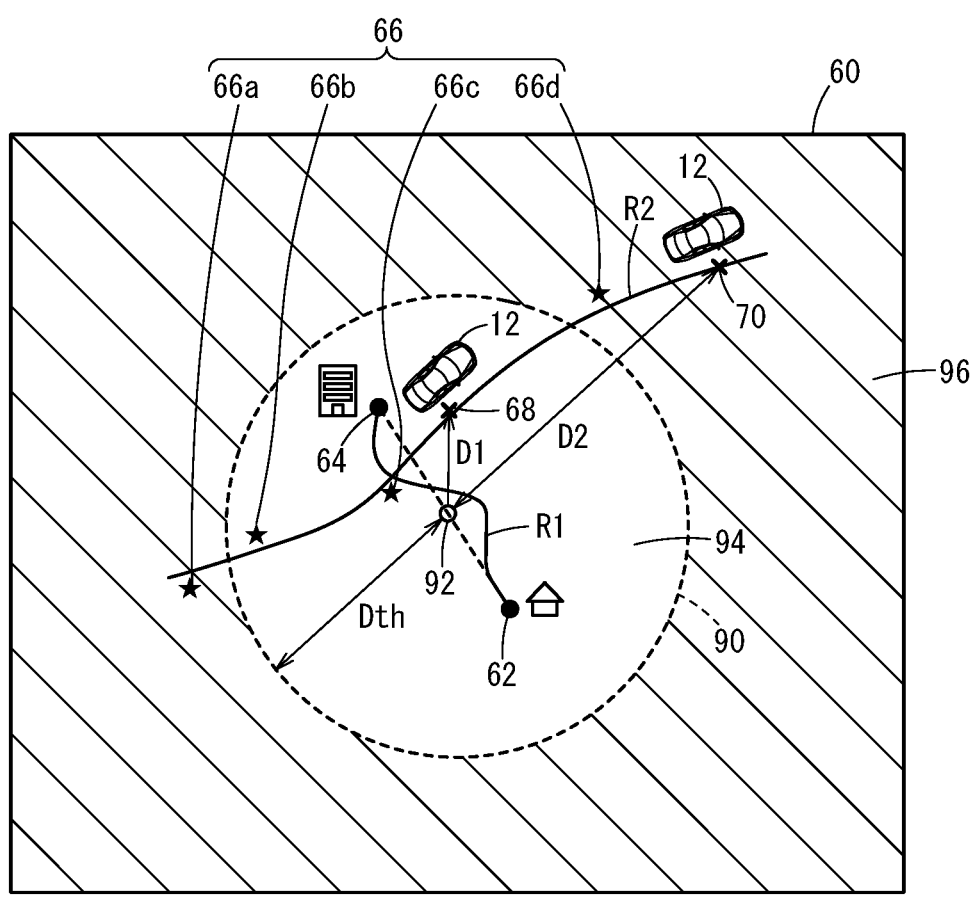
FIG. 7 illustrates how a first activity region and a second activity region may be set.

FIG. 7 illustrates how the first activity region 94 and the second activity region 96 may be set. The driving area 60 is segmented into two regions (the first activity region 94 and the second activity region 96) by a boundary 90. The boundary 90 has a shape of a circle centered at a midpoint (hereinafter the reference position 92) between the first point 62 and the second point 64 and having a radius of Dth (hereinafter referred to as a distance threshold).

This distance threshold Dth may be a fixed value or a variable value. As a specific example of the latter, taking into account the intended use of the own vehicle 12 (for example, commuting, shopping, or trip), the distance threshold Dth may be set to a value enough for covering the user's commuting area on weekdays, whereas on weekends and holidays it may be set to a greater value than that for weekdays.

In this manner, the region segmentation unit 42 may vary the setting of the first activity region 94 or the second activity region 96 in accordance with the time information acquired by the time acquisition unit 40. This allows the driving area 60 to be segmented while incorporating the trend of the activity region of the own vehicle 12 possibly varying depending on the time of travel.

At step S13, the registration processing unit 38 calculates a distance D from a certain position (the reference position 92 in this example) to the assistance location candidate 68, 70. The distance D is a so-called Euclidean distance; however, it may be a road distance instead.

At step S14, the registration processing unit 38 checks the relationship of magnitude between the distance D calculated at step S13 and the distance threshold Dth (more specifically, whether D≤Dth is satisfied or not). Since the first activity region 94 is a region defined by the circular boundary 90, this is substantially determination of whether the assistance location candidate 68, 70 falls in the first activity region 94 or not.

For example, if the assistance location candidate 68 (FIG. 7; D=D1) is detected, the relationship of D1≤Dth is satisfied (step S14: YES), so the registration processing unit 38 sets a count threshold Nth to "A" (step S15). The count threshold Nth is a parameter determining a condition for the assistance location candidate 68 to be registered as the assistance location 66 (that is, the registration condition).

Meanwhile, if the assistance location candidate 70 (FIG. 7; D=D2) is detected, the relationship of D2>Dth is satisfied (step S14: NO), so the registration processing unit 38 sets the count threshold Nth to "B" (step S16). Here, note that the magnitude relationship of A>B≥1 is satisfied.

At step S17, the registration processing unit 38 determines whether the assistance location candidate 68, 70 satisfies the registration condition or not. The registration condition is, for example, that the number of times the assistance location candidate 68, 70 has been detected (the number of detections) or the number of times the assistance location candidate 68, 70 has been passed through (the number of passages) exceeds the count threshold Nth with regard to the same vehicle or user. The registration condition is not limited to the above example but may be any one or more conditions that can evaluate the level of the confidence for the assistance location candidate 68, 70.

For example, when the assistance location candidate 68, 70 does not satisfy the registration condition for the number of passages Np (Np≥Nth) (step S17: NO), that is, when it satisfies Np<Nth, the flow proceeds to step S18.

At step S18, the registration processing unit 38 updates the content of the assistance location candidate information 44 in the storage unit 30 in order to reflect the latest information about the assistance location candidate 68, 70 (for example, adding a new record or incrementing the number of learnings). Thereafter, steps S19 to S21 are skipped and the flowchart of FIG. 6 ends.

Meanwhile, back at step S17, if the assistance location candidate 68, 70 satisfies the registration condition (Np≥Nth) (step S17: YES), the flow proceeds to step S19.

At step S19, the registration processing unit 38 checks whether the number of registrations of the assistance locations 66 has reached the upper limit (N1max for the first assistance location information 46 and N2max for the second assistance location information 48) or not. If the number of registrations has not reached the upper limit (step S19: NO), the flow proceeds to the next step S20.

At step S20, the registration processing unit 38 performs a registration process for newly adding the assistance location candidate 68, thereby updating the content of the first assistance location information 46 in the storage unit 30. Alternatively, the registration processing unit 38 performs a registration process for newly adding the assistance location candidate 70, thereby updating the content of the second assistance location information 48 in the storage unit 30. Then, the flowchart of FIG. 6 ends.

Meanwhile, back at step S19, if the number of registrations of the assistance locations 66 has reached the upper limit (step S19: YES), the flow proceeds to step S21.

At step S21, the registration processing unit 38 deletes an assistance location 66 of relatively low importance and then performs a registration process for newly adding the assistance location candidate 68, thereby updating the content of the first assistance location information 46 in the storage unit 30. Alternatively, the registration processing unit 38 deletes an assistance location 66 of relatively low importance and then performs a registration process for newly adding the assistance location candidate 70, thereby updating the content of the second assistance location information 48 in the storage unit 30.

For the example of FIG. 7, N1max=N2max=2 holds, indicating that any of the currently registered assistance locations 66a to 66d is to be deleted when adding the assistance location candidate 68, 70. For example, when adding the assistance location candidate 68, the assistance location 66 (the assistance location 66b in this example) at which the execution frequency of driving assistance is lowest is deleted. When adding the assistance location candidate 70, the assistance location 66 (the assistance location 66d in this example) farthest from the position of the first activity region 94 (the reference position 92) is deleted.

In this way, when adding a new assistance location 66 (assistance location candidate 68) while the number of registrations of the assistance locations 66 falling in the first activity region 94 has reached the upper limit, the registration processing unit 38 may perform a registration process for deleting the assistance location (for example, the assistance location 66b) at which the execution frequency of driving assistance is lowest. This can effectively leave assistance locations 66 with higher execution frequencies of driving assistance while keeping small the number of registrations in the first activity region 94.

When adding a new assistance location 66 (assistance location candidate 70) while the number of registrations of the assistance locations 66 falling in the second activity region 96 has reached the upper limit, the registration processing unit 38 may perform a registration process for deleting the assistance location (for example, the assistance location 66d) farthest from the position of the first activity region 94 (for example, the reference position 92). This can effectively leave assistance locations 66 near from the first activity region 94 while keeping small the number of registrations in the second activity region 96.

[Effects of Driving Assistance Apparatus 10]

As described above, the driving assistance apparatus 10 includes [1] the location detection unit 36 configured to detect, as the assistance location candidate 68, 70, a location at which driving assistance for the own vehicle 12 is necessary in the driving area 60 of the own vehicle 12, [2] the registration processing unit 38 configured to register the assistance location candidate 68, 70 as the assistance location 66 if the detected assistance location candidate 68, 70 satisfies the registration condition, [3] the driving assistance unit 24 configured to provide driving assistance to the own vehicle 12 at the registered assistance location 66, and [4] the region segmentation unit 42 configured to segment the driving area 60 to set the first activity region 94 in which the activity frequency of the own vehicle 12 is estimated to be relatively high and the second activity region 96 in which the activity frequency of the own vehicle 12 is estimated to be relatively low. [5] In a case where the assistance location candidate 70 falls in the second activity region 96, the registration processing unit 38 relaxes the registration condition compared to a case of falling in the first activity region 94 (the assistance location candidate 68).

In a driving assistance method according to the present invention, one or more computers [1] detect, as the assistance location candidate 68, 70, a location at which driving assistance for the own vehicle 12 is necessary in the driving area 60 of the own vehicle 12 (step S4), [2] register the assistance location candidate 68, 70 as the assistance location 66 (steps S20 and S21) if the detected assistance location candidate 68, 70 satisfies the registration condition (step S17: YES), [3] provide driving assistance to the own vehicle 12 at the registered assistance location 66 (step S9), and [4] segment the driving area 60 to set the first activity region 94 in which the activity frequency of the own vehicle 12 is estimated to be relatively high and the second activity region 96 in which the activity frequency of the own vehicle 12 is estimated to be relatively low (step S12). [5] At step S16, in a case where the assistance location candidate 70 falls in the second activity region 96, the registration condition is relaxed compared to a case of falling in the first activity region 94 (step S15).

As described, in a case where the assistance location candidate 70 falls in the second activity region 96 in which the activity frequency of the own vehicle 12 is estimated to be relatively low, the registration condition is relaxed compared to a case of falling in the first activity region 94 in which the activity frequency of the own vehicle 12 is estimated to be relatively high. Consequently, the possibility of driving assistance being available even at a location in the second activity region 96 becomes relatively high, enabling execution of appropriate driving assistance in consideration of the activity frequency of the own vehicle 12.

The registration condition may be that the number of times the assistance location candidate 68, 70 has been detected or the number of times the assistance location candidate 68, 70 has been passed through exceeds a threshold (the count threshold Nth) with regard to the same vehicle or user, and the registration processing unit 38 may relax the registration condition by making the threshold smaller in a case where the assistance location candidate 70 falls in the second activity region 96 than in a case of falling in the first activity region 94.

[Addendum]

As will be apparent, the present invention is not limited to the above-described embodiment but may be modified as desired without departing from the scope of the invention. Alternatively, the components thereof may be combined as appropriate unless technical contradiction occurs.

What is claimed is:

1. A driving assistance apparatus comprising one or more processors functioning as:
   a location detection unit configured to detect, as an assistance location candidate, a location at which driving assistance for a vehicle is necessary in a driving area of the vehicle;
   a registration processing unit configured to register the assistance location candidate as an assistance location if the assistance location candidate detected by the location detection unit satisfies a registration condition;
   a driving assistance unit configured to provide driving assistance to the vehicle at the assistance location registered by the registration processing unit; and
   a region segmentation unit configured to segment the driving area to set a first activity region in which a reference position is included and an activity frequency of the vehicle is estimated to be relatively high and a second activity region in which the activity frequency of the vehicle is estimated to be relatively low, wherein in a case where the assistance location candidate falls in the second activity region, the registration processing unit eases the registration condition compared to a case of falling in the first activity region.

2. The driving assistance apparatus according to claim 1, wherein
   the registration condition is that a number of times the assistance location candidate has been detected or a number of times the assistance location candidate has been passed through exceeds a threshold with regard to a same vehicle or user, and
   the registration processing unit eases the registration condition by making the threshold smaller in a case where the assistance location candidate falls in the second activity region than in a case of falling in the first activity region.

3. The driving assistance apparatus according to claim 1, wherein
   when adding a new assistance location while a number of registrations of the assistance locations falling in the first activity region has reached an upper limit, the registration processing unit performs a registration process for deleting the assistance location at which an execution frequency of driving assistance is lowest.

4. The driving assistance apparatus according to claim 1, wherein
   when adding a new assistance location while a number of registrations of the assistance locations falling in the second activity region has reached an upper limit, the registration processing unit performs a registration process for deleting the assistance location farthest from a position of the first activity region.

5. The driving assistance apparatus according to claim 1, further comprising:
   a time acquisition unit configured to acquire time information during traveling of the vehicle, wherein
   the region segmentation unit varies setting of the first activity region or the second activity region in accordance with the time information acquired by the time acquisition unit.

* * * * *